United States Patent
Warren

[11] 4,247,241
[45] Jan. 27, 1981

[54] STUCK EGG RELEASING MACHINE

[76] Inventor: William H. Warren, 729 S. Main St., Centerville, Mass. 02632

[21] Appl. No.: 854,614

[22] Filed: Nov. 25, 1977

[51] Int. Cl.³ .............................................. B65G 65/00
[52] U.S. Cl. .................................................. 414/417
[58] Field of Search ................ 214/300, 310; 29/426; 414/403, 417

[56] References Cited
U.S. PATENT DOCUMENTS

| 2,856,089 | 10/1958 | Lennon | 214/310 |
| 3,780,892 | 12/1973 | Frank | 214/310 X |

Primary Examiner—Robert G. Sheridan
Attorney, Agent, or Firm—Charles R. Fay

[57] ABSTRACT

A machine for removing stuck eggs from egg trays made of semi-flexible material with a series of depressions holding the eggs therein including plungers located beneath the trays and including means for raising the plungers, pressing them against the egg supporting portions of the depressions to partially invert the depressions, raising the eggs, and thereby releasing the eggs from the material of the egg trays, whereupon the eggs are lifted out and disposed of.

4 Claims, 10 Drawing Figures

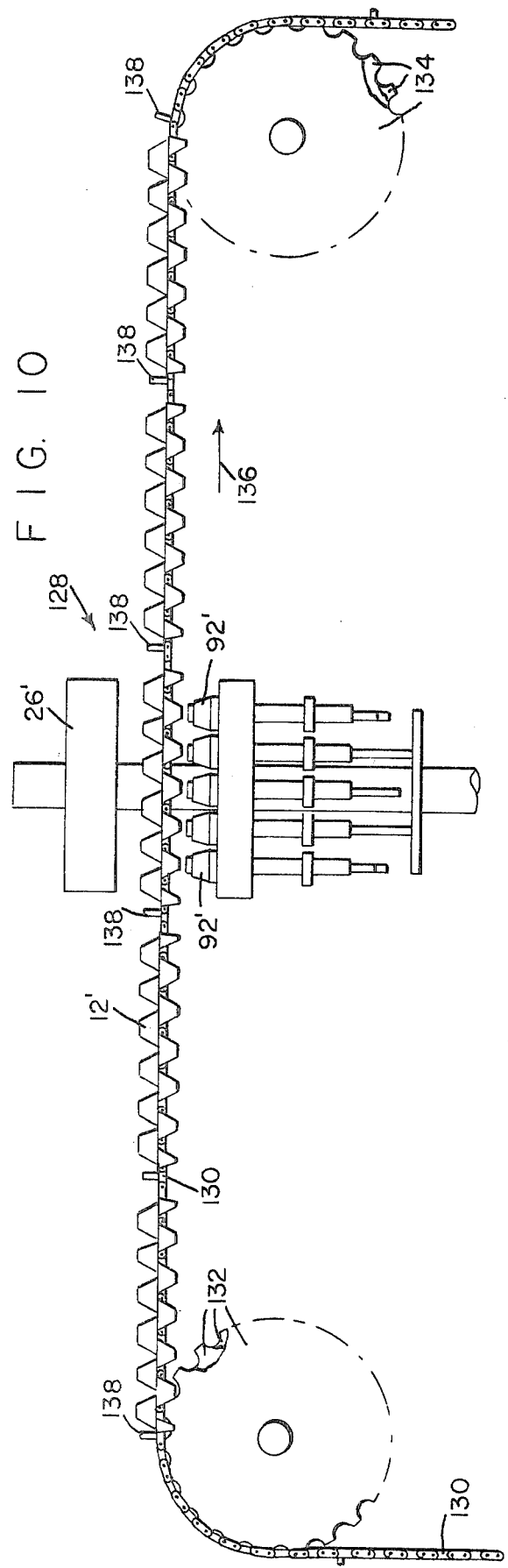

STUCK EGG RELEASING MACHINE

BACKGROUND OF THE INVENTION

In the processing of eggs, molded paper egg trays, e.g. are utilized for transporting the eggs, these trays being well-known in the art and comprising a series of rows of inverted cones in each of which an egg is positioned for carrying from one location or machine to another. At times an egg will break thus exuding the white of the egg which acts as a glue not only as to the broken egg but as to adjacent eggs which are not broken, thus holding the eggs to the paper material of the respective tray.

In many processing plants all of the eggs both the broken and the whole ones are thrown away, but it has been found to be economically feasible to save these eggs, the broken ones for material such as dog food and the like, and the whole ones to be washed and put back into the regular line of procedure in the egg processing plant. It is the object of this invention to provide such a machine and method for quickly and easily detaching the stuck eggs from the egg trays to recover the same.

DESCRIPTION OF THE PRIOR ART

Applicant knows no prior art for the purpose of mechanically unsticking or removing stuck eggs from egg trays.

SUMMARY OF THE INVENTION

A method and machine for extracting eggs stuck in egg trays wherein each egg tray includes a series of rows of inverted cones and is made of material which is semi-flexible. Parts of the tray between the cones are held at the top surface thereof by a grid-like clamp structure which will aid in holding the eggs substantially upright when extracted; at the bottom surface of the tray there are provided a series of upright fingers or rods, one for each cone, which move upwardly in a sequential fashion to impinge upon and tend to invert the cones from the bottom, thereby pushing the eggs out of the cones while being supported laterally by the grid-like hold down clamp above referred to.

BRIEF DESCRIPTION OF THE DRAWINGS

FIG. 10 is a diagrammatic view showing a modification.

DETAILED DESCRIPTION OF THE PREFERRED EMBODIMENT

Figure 1:
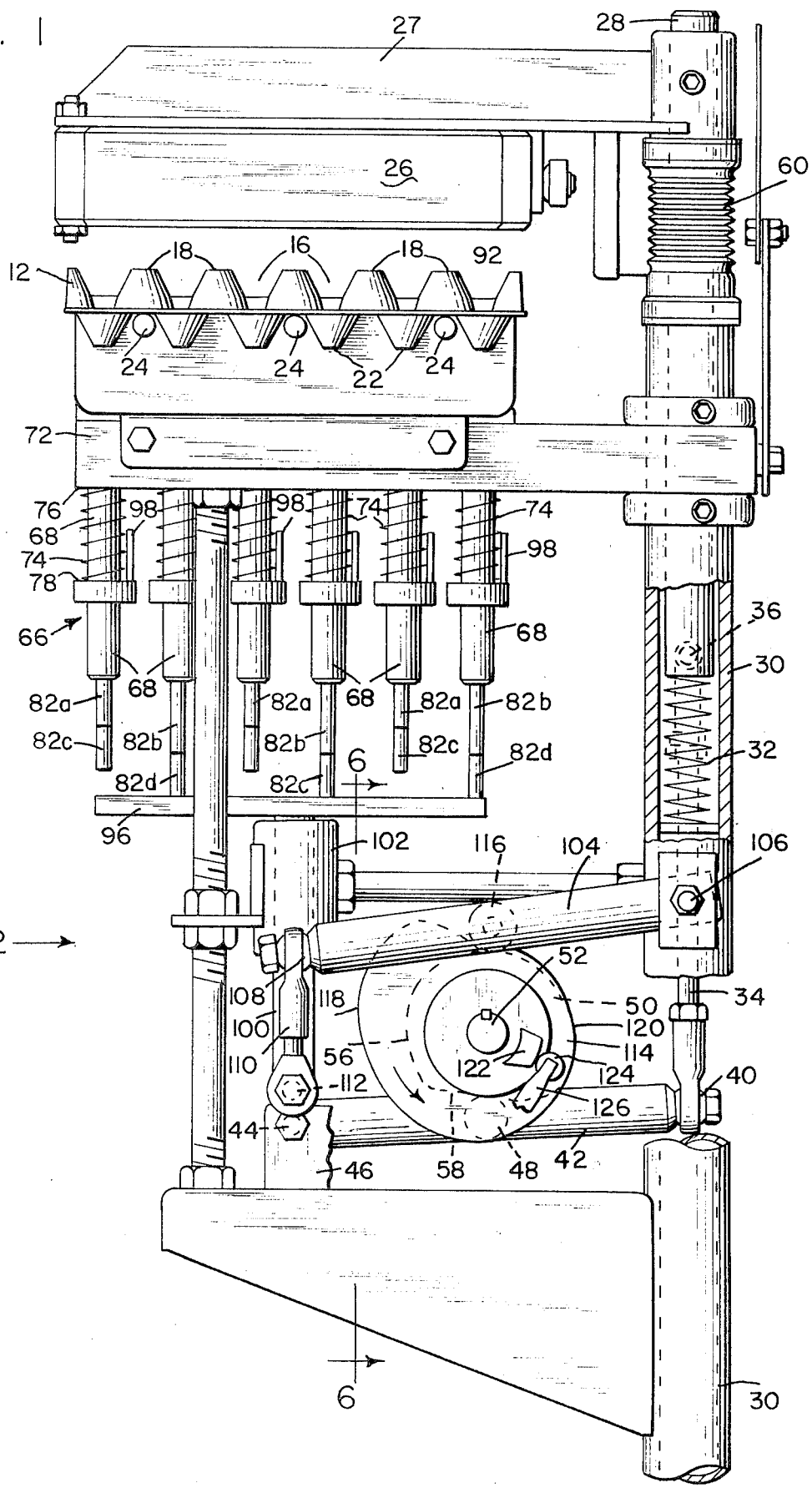
FIG. 1 is a view in side elevation showing the stuck egg releasing machine of the present invention.
Figure 2:
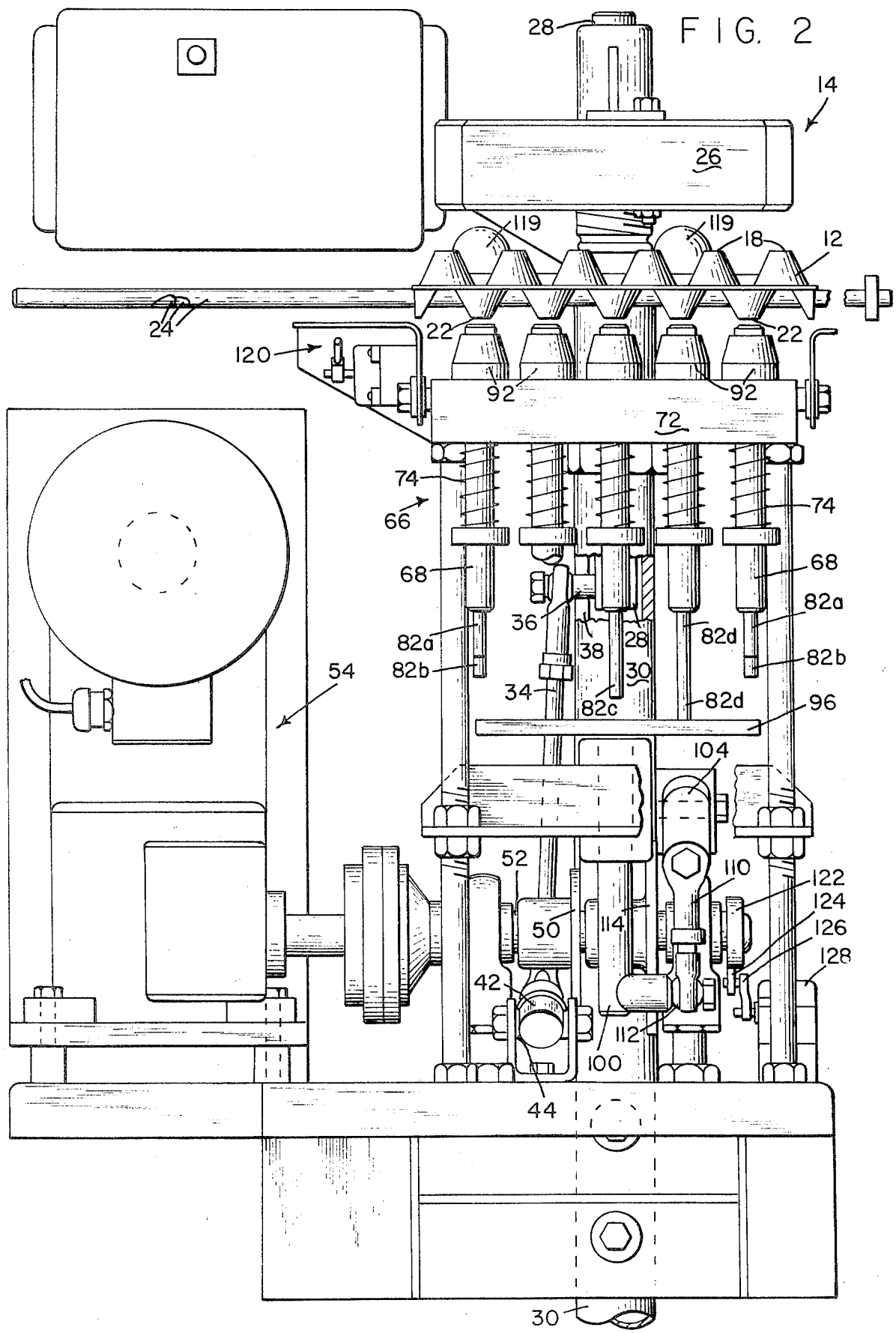
FIG. 2 is a front elevation thereof looking in the direction of arrow 2 in FIG. 1.
Figure 5:
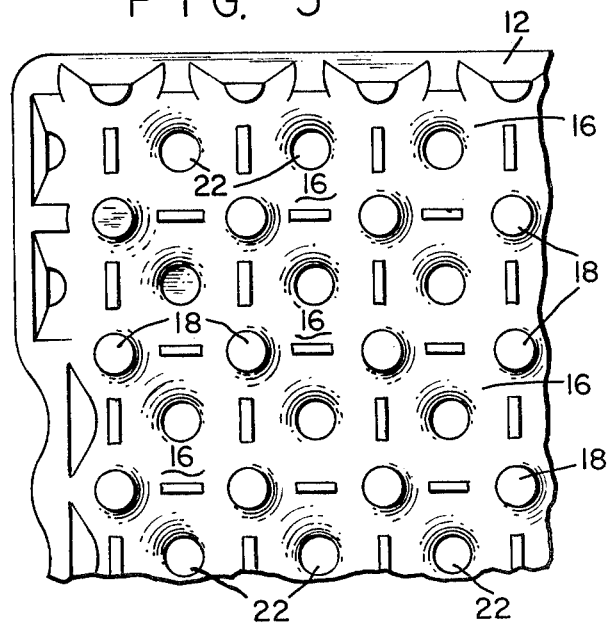
FIG. 5 is a fragmentary plan view of an egg tray.

Referring to FIGS. 1 and 2, a tray 12 is shown in egg releasing position within the egg releasing machinery of the present invention generally indicated by reference numeral 14. The tray itself as shown in FIG. 5 has a plurality of rows of frustro-conical egg receiving pockets 16. Each row of pockets is separated by a row of upper flat surfaces 18 so that each pocket is surrounded by four surfaces 18. The bottoms of each pocket are also flat thereby creating a plurality of lower flat surfaces at their undersides indicated at 22 in FIGS. 1 and 2. The trays 12 are placed within the egg extracting machine 14 on horizontal support rods 24 which extend between rows of egg receiving pockets 16 as shown in FIG. 1. The rods 24 enable the egg tray to be accurately positioned within the machine.

The egg extracting machine 14 includes an upper clamp plate 26 supported by a bracket 27 which is attached to a vertical plunger 28 which is slidably mounted within a hollow guide post 30. The lower end of vertical plunger 28 is supported on a spring 32 which maintains clamp plate 26 in its upper inactive position as shown in FIG. 1. The upper end of a connecting rod 34 is pivotally attached at 36 to the lower end of vertical plunger 28. Although connecting rod 34 extends along the outside of guide post 30 as shown in FIG. 2 the pivotal connection 36 extends through a slot 38 in the wall of the guide post 30. The lower end of connecting rod 34 is pivotally attached as at 40 to one end of a lever 42 which in turn is pivotally connected at 44 to the machine frame 46. A follower 48 is attached at a point intermediate the ends of lever 42 for engagement by a clamp cam 50 keyed to a drive shaft 52. Drive shaft 52 is rotatably driven by any suitable electrically operated drive mechanism such as that which is generally indicated by the reference numeral 54 in FIG. 2. Clamp cam 50 has a high surface 56 and a low surface 58. For each rotation of clamp cam 50, the high surface 56 is effective to rock lever 42 clockwise and thereby cause plunger 28 to compress spring 32. A sanitation bellows 60 is located at the top of the hollow post 30 and bracket 27. As the follower 48 is engaged by the lower surface 58 of cam 50, vertical plunger 28 is allowed to be returned to its upper position by spring 32. Since the upper portion of bellows 60 is fixed to bracket 27 and the lower portion of the bellows is fixed to the upper end of guide post 30, bellows 60 will again be extended upon upward movement of the vertical plunger 28.

Figure 7:
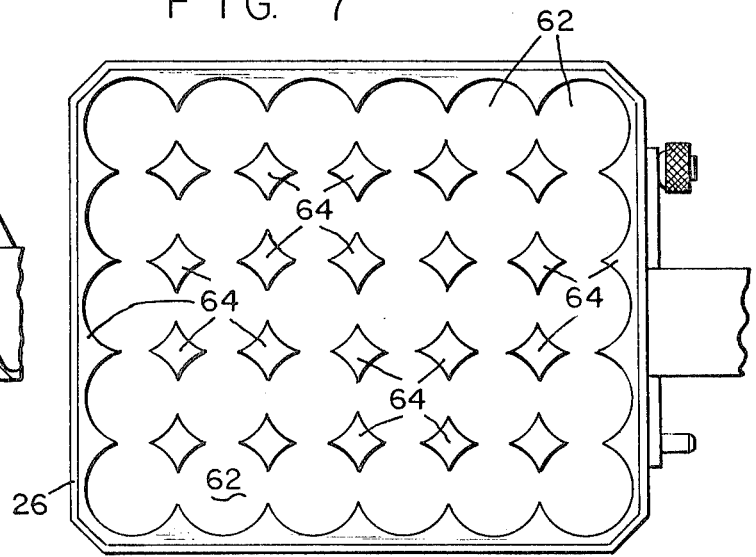
FIG. 7 is a bottom plan view of the upper clamp plate.

Referring to FIG. 7, upper clamp plate 26 has a plurality of egg cavities 62 which are partially separated by clamping surfaces 64, when the egg tray 12 is properly positioned within the machine 14, egg cavities 62 are vertically aligned with the egg receiving pockets 16 and supporting surface 64 are vertically aligned with the upper flat surfaces 18 of the tray. When the upper clamp 26 is lowered, as in the manner previously described, surfaces 64 engage surfaces 18 and any stuck eggs which may be present in the tray will extend into the cavities 62, see also FIG. 9.

Figure 4:
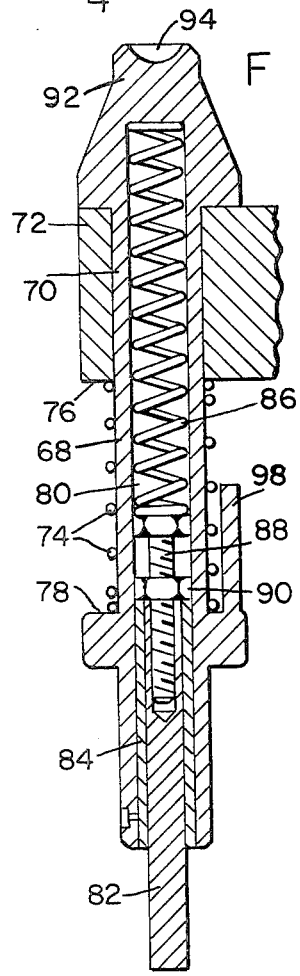
FIG. 4 is a vertical section of one of the pressers taken along line 4—4 of FIG. 3 and shown in an enlarged scale.

Referring to FIGS. 1, 2 and 4 egg extracting machine 14 also includes a presser assembly generally indicated by the reference numeral 66 for removal of the stuck eggs. Presser assembly 66 comprises a plurality of pressers 68 slidably mounted in vertical slots 70 in a presser guide plate 72. Each presser 68 is surrounded by a compression spring 74 which extends between the bottom surface 76 of the guide plate and a shoulder 78 of the presser, to maintain the presser in its lower inactive position as shown in FIG. 4. Each presser 68 has a hollow interior 80 which houses a plunger 82 which is slidably mounted therein within a removable bushing 84. Plunger 82 is maintained in its lower position, as shown in FIG. 4, by an inner compression spring 86 which bears against an adjusting bolt 88 threaded into the upper portion of plunger 82. The compression pressure of spring 82 is adjusted by removing the bushing 84 together with plunger 82 and adjusting the adjusting bolt 88. A lug nut 90 maintains the adjusting bolt at the desired set position. Each presser 68 also includes an upper engaging head 92 which bears against the upper surface of plate 72 in opposition to compression spring 74. The top of each head 92 has an indentation 94. When the tray 18 is in its proper position within the machine 14, the heads 92 of the pressers are aligned with the bottom surfaces 22 beneath the egg receiving pockets 16. During a stuck egg removing cycle, the heads 92 of pressers 68 are moved into engagement with surfaces 22 of the tray by means of a lift plate 96. Upper movement of upper lift plate 96, by means to be described, causes the lift plate to strike the plungers 82 of the pressers. Springs 82 have a greater compressive force than springs 74, so that movement of the plate 96 against plungers 82 causes each presser 68 to move upperwardly against springs 74. The degree of upward movement of each presser is determined by a stop 98 which strikes the upper surface 96 of the presser guide plate. When this occurs, any continued upper movement of plunger 82 compresses spring 86. The purpose of this is to enable the plungers 82 to be lifted in varying degrees and yet the tray engaging heads 92 are all lifted vertically by the same amount to the same level. As shown in FIGS. 1 and 2, the plungers 82 have different lengths and comprise four different lift groups identified as 82a, 82b, 82c and 82d. Plungers 82a have the shortest length and plungers 82d have the longest length. When the lift plate 96 is moved upwardly, plungers 82d are engaged first and consequently, their corresponding tray engaging heads 92 are lifted into egg moving engagement with corresponding egg receiving pockets 16 of the tray. By the time that lift plate 96 engages plungers 82c the tray engaging heads 92 which correspond to plungers 82d will have been lifted to their full vertical position. At this point vertical movement of plungers 82c will cause their corresponding tray engaging heads 92 to be moved to their full vertical position while plungers 82d compress their corresponding springs 86. The tray engaging heads 92 which correspond to plungers 82b are next moved to their full vertical position while plungers 82c and 82d compress their corresponding springs 86. The remaining heads 92 are then moved to their upper vertical position while plungers 82c, 82d and 82b compress their corresponding springs 86. Because of the variability in lengths of plungers 82, each stuck removing cycle comprises a four step sequence.

Lift plate 96 is supported on a vertical shaft 100 which is slidably mounted within a fixed supporting block 102. The mechanism for actuating lift plate 96 includes a lever 104, one end of which is pivotally connected at 106 to guide post 30 and the other end of which is pivotally attached to 108 to one end of the vertical like 110. The lower end of link 110 is pivotally connected to the lower end of vertical shaft 100. A lift plate cam 114 is keyed to drive shaft 52 and engages a lift plate cam follower 116 on lever 104. Lift plate cam 114 has a high surface 118 and a low surface 120. The drive shaft 52 is rotated in a counterclockwise direction as viewed in FIG. 1. During each rotation of cam 114, the follower 116 rides along the low surface 120 and is lifted gradually until engaged by high surface 118. The upward vertical movement of the follower 116 causes lift plate 96 to be lifted to its upper vertical position wherein all of the plungers 82 are actuated in the manner previously described. The timing of cams 50 and 114 is such that at the beginning of each cycle, upper clamp plate 26 is lowered into its clamping position with the upper flat surfaces 18 of the tray in engagement with surfaces 18 of the tray 12. The lift plate 96 is then raised to sequencely lift plungers 82.

Figure 3:
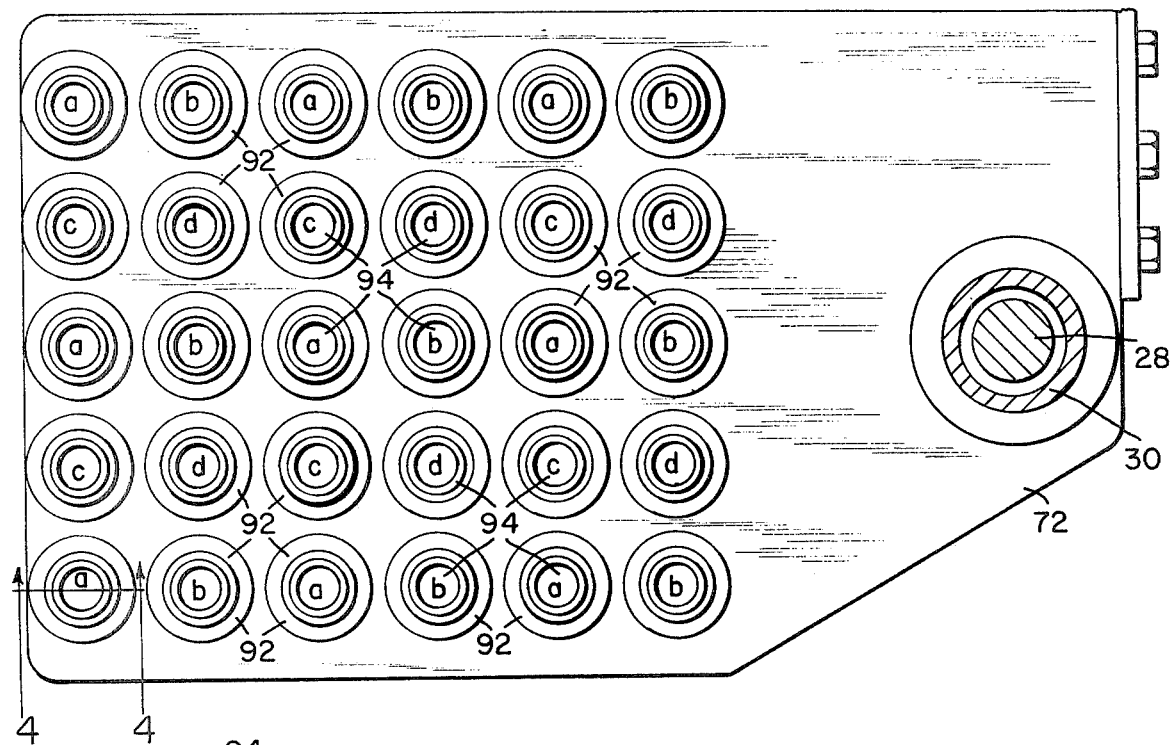
FIG. 3 is a plan view of the presser guide plate and pressers.
Figure 8:
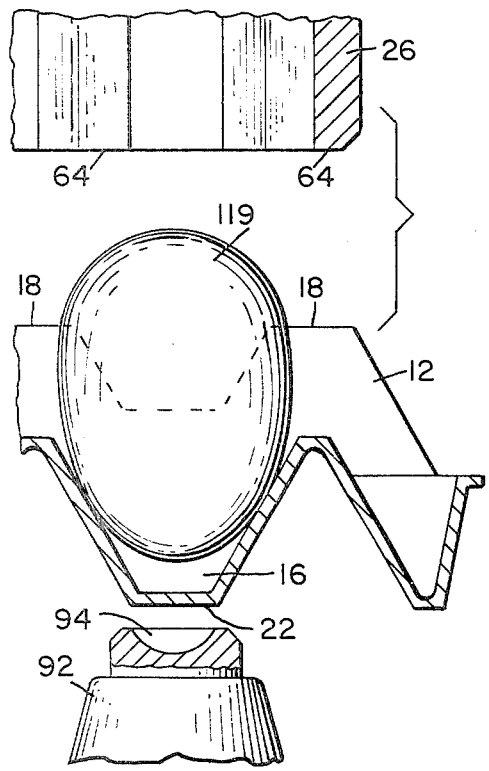
FIG. 8 is an enlarged diagrammatic section showing a stuck egg in one of the tray pockets prior to extraction thereof.
Figure 6:
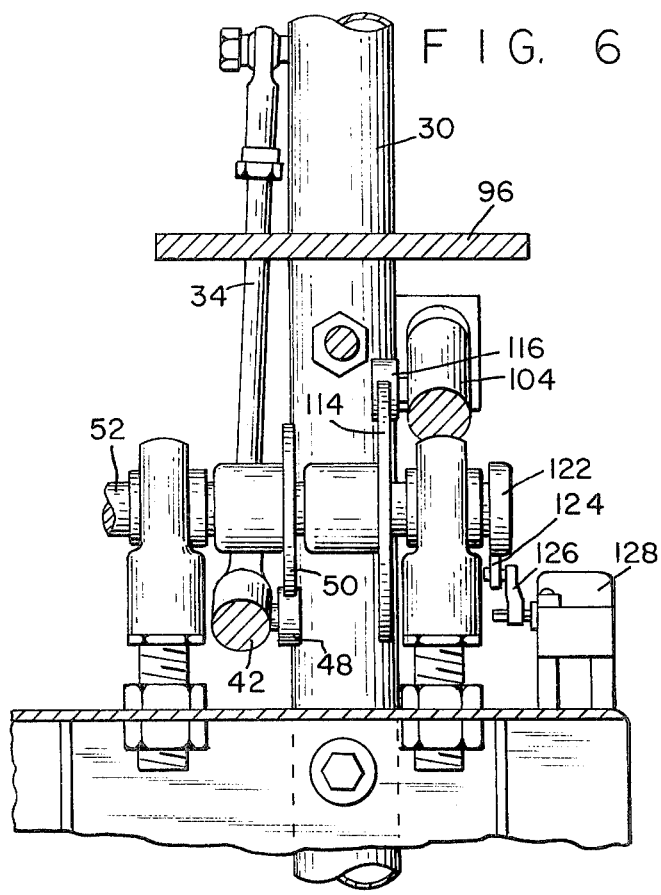
FIG. 6 is a fragmentary vertical section taken along line 6—6 in FIG. 1.
Figure 9:
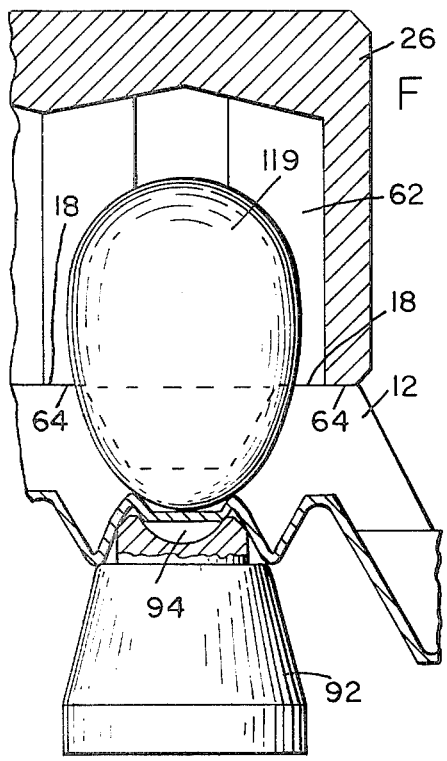
FIG. 9 is a similar view showing the egg extracted from the tray pocket.

Referring to FIGS. 8 and 9 the manner in which the tray engaging heads 92 cooperate with clamp plate 26 for removing stuck eggs is clearly illustrated. In FIG. 8, clamp plate 26 and one of the tray engaging heads 92 are shown in their inactive positions. The tray 12 is shown in its properly aligned position with a stuck egg indicated at 119 in one of the pockets 16. In FIG. 9 the upper clamp plate 26 is shown in clamping position against the upper flat surfaces 18 of the tray. The tray engaging head 92 is shown in its upper actuating position wherein it has caused the bottom of the pocket 16 to be inverted to effectively loosen the stuck egg and lift the egg within the egg cavity 62 with which it is aligned. Since the tray receiving heads 92 are raised vertically sequencely, only certain pockets 16 are initially pushed upwardly to the inverted position as shown in FIG. 9. The previously identified groups of plungers 82 are arranged in a pattern whereby the corresponding tray engaging heads of each of the groups are separated so that no two adjacent tray engaging heads 92 engage the tray at the same time. This pattern is depicted in FIG. 3 wherein the tray engaging heads which correspond to the plunger groups 82a, 82b, 82c and 82d are identified by the letters a, b, c and d respectively. As can be seen in FIG. 3, the pattern of the heads is such that the individual members of each group are completely surrounded by members of the other groups. In this way when a particular tray engaging head 92 is moved upwardly into egg extracting position, all surrounding heads are in inactive position or have been previously brought into active position. This also means that the force which is applied to the egg extracting pocket by a tray engaging head 92 is opposed by four surfaces 64 of upper clamp plate 26. The upper pressure exerted by each group of tray engaging heads 92 for deforming corresponding pockets 16 of the tray is distributed fully and evenly across the entire lower surface of clamp plate 26 represented by the areas 64. Since the trays are made of a deformable material relatively flimsy, the upper flat surfaces 18 would collapse if all of the egg receiving pockets 16 were deformed simultaneously.

GENERAL OPERATION

To begin a stuck egg removing sequence, a tray containing stuck eggs 118 is placed on the supporting rods 24 in the position shown in FIGS. 1 and 2. A start lever 120 is depressed which energizes the drive unit 54 to rotate drive shaft 52 in the counterclockwise direction and viewed in FIG. 1. Clamp cam 50 actuates follower 48 so that the upper clamp plate 26 is lowered to the clamping position against the upper flat surfaces 18 of the tray. Shortly thereafter, cam 114 acts on follower 116 to elevate lift plate 96. This raises the plunger groups 82d, 82c, 82b and 82a in sequence to sequentially invert the pockets 16 of the tray. After all of the pockets have been inverted to free any stuck eggs which may be in the tray, the lift cam follower 116 drops from the high surface 118 to the lower surface 120 of lift cam 114 to lower the lift plate 96. When this happens all of the springs 74 return the pressers to their lower inactive positions. At the same time follower 48 drops from its high surface 56 to the low surface 58 of the clamp cam 50 to raise the upper clamp plate 26 to its inactive or non-clamping position as shown in FIG. 1. Also at this time, a cam 122 engages a follower 124 which is attached to a switch arm 126. When follower 124 is so engaged, switch arm 126 is rocked in a clockwise direction to actuate a stop switch 128 which deactivates drive unit 54. The rotation of drive shaft 52 is stopped so that cams 50 and 114 are in the position shown in FIG. 1 in readiness for a subsequent stuck egg removing cycle.

MODIFICATION

Referring to FIG. 10, there is shown a modified stuck egg extracting machine generally indicated by the reference numeral 128. This modification is identical to that of the preferred embodiment except that instead of supporting the tray on support rods such as 24, the trays indicated by reference numeral 12' are supported on a plurality of conveyor chains 130. The conveyor chains 130 are trained around groups upper drive sprockets 132 and 134 and extend between an upper clamp plate 26' and tray extracting heads 92' of egg extracting machine 128. Chains 130 are advanced in the direction of arrow 136 and trays 12' are advanced in the same direction by lugs 138 which extend upwardly from the chains 130. Upper drive sprocket 134 are driven intermittently by drive means not shown and the chains 130 extend downwardly to other idler sprockets also not shown so that chains 130 pass beneath the egg extracting machine 128 and upwardly to sprockets 132. The trays containing stuck eggs are placed on chains 130 at the left hand side of the machine 128 as viewed in FIG. 10 and they are removed from the right hand side of the machine as viewed in FIG. 10, after they have passed through the machine for stuck egg removal cycles.

I claim:

1. Apparatus for removing at least one egg stuck in an egg tray, wherein the egg tray includes substantially continuous depressions of semi-flexible nature for the reception of an egg in a depression, said egg tray also having upwardly extending members rising between the depressions, wherein the apparatus comprises means providing for a line of advance of said egg tray with at least one stuck egg in a depression therein, an upper clamping plate having downwardly extending projections to coincide with the upwardly extending members of the egg tray, said projections being interspersed with spaces for the reception of portions of the eggs as they are unstuck from the egg tray, and a series of plungers at the opposite side of the egg tray from the egg tray upper clamping plate, means providing for advancing said plungers, said plungers being in alignment with the depressions of the egg tray, said plungers at least partially inverting said depressions and thereby raising any stuck egg tending to release the same from the stuck condition thereof with respect to the egg tray, and means for advancing said plungers in a sequential pattern, several spaced plungers being raised at one time and other plungers being raised in timed relation thereto, whereby all plungers are not advanced at the same time.

2. The apparatus of claim 1 including means for stopping the advance of certain plungers in timed relation to certain other plungers.

3. Apparatus for loosening stuck eggs in a semi-flexible deformable egg tray, having a plurality of rows of spaced continuous depressions for holding eggs, the under surfaces of said depressions forming the lowermost surfaces of said tray, said tray having spaced top surfaces horizontally spaced from said depressions, said apparatus comprising:

a. support means for supporting said tray,
 b. clamp means for bearing against said top surface and preventing upward movement of said tray; and
 c. presser means for applying upward compressive force against the lowermost surfaces of preselected groups of said depressions wherein said compressor force is applied to each of said groups in sequence and whereby the depressions of each of said groups are at least partially inverted to loosen any stuck eggs therein, wherein said presser means comprises:
  a. a horizontal guide plate located below said support means;
  b. a plurality of spaced pressers mounted for vertical motion within said guide plate, said pressers having upper portions which are aligned with respective lowermost surfaces of said depressions and lower portions which extend below said guide plate, said pressers being arranged in groups wherein the lower portions of each presser group extend downwardly to the same level and lower portions of each presser group extend downwardly to a different level than those of every other presser group;
  c. a horizontal bottom plate located below said pressers; and
  d. means for vertically reciprocating said horizontal bottom plate.

4. The apparatus of claim 3 wherein at least some of said pressers each comprises:

a. a vertical tube having a closed top and being slidably mounted for vertical motion within said guide plate and constituting said upper portions;
 b. a plunger slidably mounted within said vertical tube and constituting said lower portion;
 c. a compression spring located within said vertical tube between said plunger and the closed top of said tube;
 d. upper stop means for limiting the downward travel of said vertical tube;
 e. lower stop means for limiting the upper travel of said vertical tube; and
 f. resilient means for maintaining said presser in its lowermost position, said resilient means being weaker than said compression spring so that upward movement of said lower portion by said horizontal bottom plate causes it to overcome said resilient means and move said upper portions upwardly to said compression spring to an upper position determined by said lower stop means, at which point compression of said compression spring enables said plunger to move upwardly relative to said vertical tube as the result of additional upward movement of said bottom plate.

* * * * *